United States Patent
Yamamoto

(10) Patent No.: US 6,814,178 B2
(45) Date of Patent: Nov. 9, 2004

(54) ELECTRIC POWER STEERING APPARATUS

(75) Inventor: Yasuharu Yamamoto, Toyota (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/409,116

(22) Filed: Apr. 9, 2003

(65) Prior Publication Data

US 2003/0192735 A1 Oct. 16, 2003

(30) Foreign Application Priority Data

Apr. 12, 2002 (JP) .......................................... 2002-110811

(51) Int. Cl.⁷ .............................................................. B62D 5/04
(52) U.S. Cl. ........................................................... 180/444
(58) Field of Search ................................. 180/444, 446, 180/443

(56) References Cited

U.S. PATENT DOCUMENTS

| | | | | |
|---|---|---|---|---|
| 4,766,970 A | * | 8/1988 | Shimizu ..................... | 180/444 |
| 4,773,497 A | * | 9/1988 | Carlson et al. ............. | 180/444 |
| 5,650,701 A | * | 7/1997 | Shimizu et al. ............ | 318/489 |
| 5,685,390 A | * | 11/1997 | Chikuma et al. ........... | 180/444 |
| 6,041,885 A | * | 3/2000 | Watanabe et al. .......... | 180/444 |
| 6,173,802 B1 | * | 1/2001 | Kodaira et al. ............. | 180/444 |
| 6,378,646 B1 | * | 4/2002 | Bugosh ...................... | 180/444 |
| 6,427,799 B1 | * | 8/2002 | Kodaira ...................... | 180/444 |
| 6,454,042 B1 | * | 9/2002 | Yoshida et al. ............. | 180/444 |

* cited by examiner

Primary Examiner—Lesley D. Morris
Assistant Examiner—Tony Winner
(74) Attorney, Agent, or Firm—Oblon, Spivak, McClelland, Maier & Neustadt, P.C.

(57) ABSTRACT

In an electric power steering apparatus 10, when a steering torque rotates a pinion 30, a rack shaft 12 having a rack to engage with the pinion is axially moved. At this time, a ball screw nut 36 engaging with a screw groove 34 of the rack shaft 12 through plural balls 68 is rotated by an electric motor 24 so that the axial movement of the rack shaft 12 is assisted. Each of the pinion and a bearing supporting the ball screw nut 36 is positioned at a place corresponding to minimum amplitude of a free vibration of the rack shaft to restrain a transfer of the vibration of the rack shaft to the vehicle body.

6 Claims, 3 Drawing Sheets

PRIOR ART

ELECTRIC POWER STEERING APPARATUS

INCORPORATION BY REFERENCE

The present application claims priority under 35 U.S.C. §119 to Japanese Patent Application No. 2002-110811, filed on Apr. 12, 2002. The contents of that application are incorporated herein by reference in their entirety.

BACKGROUND OF THE INVENTION

1. Field of the Invention

The invention relates to an electric power steering apparatus to assist a steering by a force of an electric motor, more particularly relates to a rack and pinion electric power steering apparatus to assist an axial movable rack shaft by the assisted force.

2. Description of the Related Art

It is typically known a rack and pinion type electric power steering device (EPS) assisting a steering force of a steering wheel, mounted on a vehicle, by a driver. The rack and pinion type EPS acts the assisted steering force to tires through a rack shaft and through a tie rod and a knuckle arm. The rack and pinion type EPS is, for example, disclosed in the Japanese laid-open publication No.11-11333.

The typically known rack and pinion EPS is shown in FIG. 1. An electric power steering device 100 includes a pinion 102 connecting to a steering wheel through an un-illustrated steering shaft. The pinion 102 is rotated by a steering torque caused by a steering of the steering wheel. With the pinion 102 is engaged a rack 106 formed on one end of a rack shaft 104. Both ends of the rack shaft 104 are connected to right and left tires 112 through each of tie rods 108 and knuckle arms 110 and thus the tires 112 are constructed as a steered wheel to be steered by an axial movement of the rack shaft 104.

In the electric power steering device 100, the pinion 102 is rotated by an operation of the steering wheel and a rotating force, that is an assisted torque, of the pinion 102 is transformed into an axial movement force, that is an assisted rotating force or an assisted sting force, of the rack shaft 104. The tires 112 are steered by the axial movement of the rack shaft 104. The pinion 102 is rotatably mounted on a vehicle body to be maintained in engaging with the rack 106 by a rack guide 114. On the other end of the rack shaft 104 is mounted a ball screw mechanism 116 connected to an un-illustrated electric motor. A ball screw nut 120 of the ball screw mechanism 116 is engaged through plural balls with a screw groove 118 formed on a peripheral surface of the other end of the rack shaft 104. The rotating force of the electric motor rotates the ball screw nut 120 to be transformed into the axial movement of the rack shaft 104. The ball screw nut 120 is also rotatably mounted on the vehicle body by a bearing. A torque sensor is equipped between an input shaft and an output shaft of said un-illustrated steering shaft to detect a torque, that is a steering force and a direction of the steering force, rotating the ball screw nut 120 to a direction according to that of the steering.

In said typically known rack and pinion electric power steering device, the driver steers the steering wheel to rotate the pinion 102 in order to move the rack shaft 104 axially. At this moment, the torque sensor detects the steering and the electric motor rotates the ball screw nut 120 in the direction according to that of the steering. Thereby, the assisted steering force into which the torque of the electric motor is transformed acts on the rack shaft 104 to assist the steering force of the steering wheel by the driver.

In the typically known rack and pinion electric power steering device 100, there are a reverse force against the tires from a road and a vibration of an engine and also the steering of tires to cause a free vibration of the rack shaft 104 based on its natural frequency. The rack shaft 104 is supported on the vehicle body by the pinion 102 or the rack guide 114 and the ball screw mechanism 116. Since the pinion 102 and the ball screw mechanism 116 are positioned without relationship to a length of the rack shaft 104, that is without relationship to an amplitude distribution of the free vibration, so that the free vibration causes a deviation in the engagement of the rack 106 with the pinion and also causes a load deviation to the ball screw mechanism 116 to make a knocking noise and to force a life deterioration. The vibration of the rack shaft 104 is transferred to the steering wheel through the pinion 102 to make an uncomfortable steering feeling for the driver.

Said Japanese laid-open publication No.11-11333 discloses a technology to restrain the amplitude by setting a bush in a location of approximately maximum of the amplitude of the vibration in the rack shaft. This disclosure shows only a decrease of the amplitude of rack shaft by increasing a number of supporting points. This disclosure is same to the typically known rack and pinion electric power steering device because a pinion and a ball screw mechanism of this disclosure is located without any relationship to a length of the rack shaft, so that it does not eliminate a deviation in an engagement of the rack with the pinion nor a load deviation to the ball screw mechanism. In this disclosure, the bush restraining the amplitude of the rack shaft is secured to a vehicle body so that the vibration of the rack shaft is transferred to the body by a collision against the bush to decrease a life of an electric power steering device in this disclosure and to cause a knocking noise.

SUMMARY OF THE INVENTION

In view of the previously mentioned circumstances, it is an object of the present invention to provide an electric power steering apparatus that restrains a transfer of a vibration of a rack shaft to a vehicle body.

It is second object of the present invention to provide an electric power steering apparatus that eliminates a deviation in an engagement of a rack with a pinion and eliminates a knocking noise.

It is third object of the present invention to provide an electric power steering apparatus that restrains a transfer of a vibration to a steering wheel through a pinion.

It is fourth object of the present invention to provide an electric power steering apparatus that restrains a load deviation against a nut supported by a bearing.

It is another object of the present invention to provide an electric power steering apparatus that further restrains the load deviation by an axial location of a bearing.

During the process of completing the invention, the inventors constructed models for theoretical analysis, digital analysis, geometric analysis, motion analysis, and load distribution analysis of the vibration of the rack shaft to investigate minimum amplitude of the vibration. As a result of this investigation, it was confirmed that each longitudinal location of the pinion and the bearing is positioned in a place corresponding to minimum amplitude of a free vibration of the rack shaft to restrain a transfer of the vibration of the rack shaft to the vehicle body The invented electric power steering apparatus was completed as a result of this investigation. The electric power steering apparatus according to the invention includes a rack shaft having a rack and a screw groove, a pinion engaging with the rack to move the rack shaft, a nut engaging with the screw groove to be rotated by an electric motor, wherein each longitudinal location of the pinion and the bearing is positioned in a place corresponding to minimum amplitude of a free vibration of the rack shaft. In this invention, when the pinion is rotated by a steering torque based on a steering of a steering wheel connecting to the pinion, the rack shaft having the rack engaged with the pinion is axially moved. Thereby, the steering torque is transformed into the steering force to move axially the rack shaft by the pinion and the rack. At this time, the electric motor rotates the nut according to the steering torque to assist the axial movement of the rack shaft. Thereby, the driving force of the steering wheel by the driver is reduced.

One aspect of this invention is that said each longitudinal location of the pinion and the bearing is positioned in a place corresponding to minimum amplitude of the free vibration of the rack shaft in said neutral position so that the pinion and the nut supported by the bearing are not almost affected by the free vibration. And also, since the amplitude of the rack shaft near the pinion is extremely small, it eliminates a deviation in an engagement of the rack with the pinion and eliminates a knocking noise and it restrains a transfer of the vibration to the steering wheel through the pinion to improve a steering feeling. Since the amplitude of the rack shaft near the bearing is small, it restrains a load deviation acting to the nut supported by the bearing.

The other aspect of this invention is that a location of a rotating center of the pinion is positioned in a state that a distance from an end face of the rack shaft in the neutral position is equal to a length of 0.224L or 0.359L or is within a length from 0.224L to 0.359L wherein the L is a length of the rack shaft, so that the pinion is not almost affected by the free vibration. Because the amplitude of the rack shaft near the pinion is very small, it eliminates the deviation in the engagement of the rack with the pinion and eliminates the knocking noise and also it restrains a transfer of the vibration to the steering wheel through the pinion to improve the steering feeling.

Another aspect of the invention is that a location of an axial center of the bearing is positioned in a state that a distance from the end face of the rack shaft in the neutral position is equal to a length of 0.224L or 0.359L or is within a length from 0.224L to 0.359L, so that the nut supported by the bearing are not almost affected by the free vibration. Because the amplitude of the rack shaft near the bearing is extremely small, it restrains the load deviation acting to the nut supported by the bearing.

More another aspect of the invention is that an axial center of the bearing coincides with an axial center of the nut so that a load acts on the nut supported by the bearing to restrain the load deviation more.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

A preferred embodiment of an electric power steering apparatus 10 according to the aforementioned invention will be described referring to FIG. 2 to FIG. 5. Hereinafter, it will be described outline of the electric power steering apparatus 10 first, and then a detailed structure of the electric power steering apparatus 10.

Figure 1:
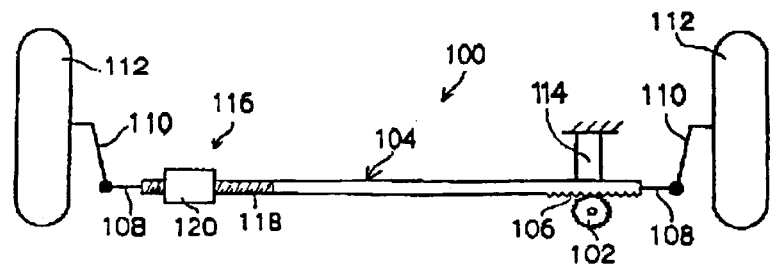
FIG. 1 is a rack and pinion power steering device of a related art.
Figure 2:
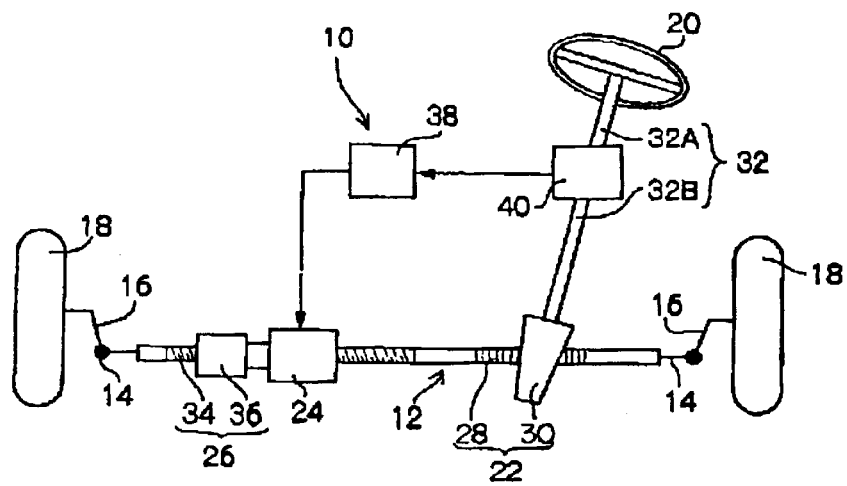
FIG. 2 is an outline view of an electric power steering apparatus according to an embodiment of a present invention.

The outline is shown in FIG. 2 relating to the electric power steering apparatus in a stage fixed on a vehicle body. Referring to FIG. 2, the electric power steering apparatus 10 provides a rack shaft 12 with longitudinal direction in a direction of a transversal width of the vehicle body. The rack shaft 12 is connected to light and left tires 18, which are steered wheel, through a tie rod 14 and a knuckle arm 16. Each tire 18 is steered by a movement of the rack shaft 12 in a longitudinal direction The rack shaft is moved by a rack and pinion mechanism 22 and a ball screw mechanism 26. The rack and pinion mechanism 22 transfers a steering torque at a steering or revolution of a steering wheel 20 and the ball screw mechanism 26 transfer an assisted torque generated by an electric motor 24 of a brushless DC motor.

The rack and pinion mechanism 22 constructs a rack 28 and a pinion 30. The rack 28 is formed on one axial portion of the rack shaft 12. The pinion 30 is engaged with the rack 28 and is connected to the steering wheel 20 through a steering shaft 32. According to a rotation of the pinion 30 of the rack and pinion mechanism 22 by said steering torque, the rack shaft 12 is axially moved through the rack 28 engaging with the pinion 30. In other words, the rack and pinion mechanism 22 transforms the steering torque to the steering force or a rotating force moving axially the rack shaft 12.

The ball screw mechanism 26 constructs a screw groove 34 and a ball screw nut 36. The screw groove 34 is formed on the other axial portion of the rack shaft 12. The ball screw nut 36 is engaged with the screw groove 34 through plural balls 68 (described hereafter) and is connected to the electric motor 24. According to a rotation of the ball screw nut 36 of the ball screw mechanism 26 by a driving force (said assisted torque), the rack shaft 12 is axially moved through the screw groove 34 engaging with the ball screw nut 36. In other words, the ball screw mechanism 26 transforms the assisted torque to the assisted steering force or a assisted rotating force assisting to move the rack shaft 12 axially.

The electric motor 24 is electrically connected to a control circuit 38. The control circuit 38 is electrically connected to a torque sensor 40 detecting the steering torque to be generated by an operation of the steering wheel 20. The torque sensor 40 is located between an input shaft 32A and an output shaft 32B consisted of the steering shaft 32 to detect the steering torque based on a relative angular displacement between the input shaft 32A and the output shaft 32B or based on each absolute angular displacement of the input and output shaft 32A, 32B. The control circuit 38 energizes the electric motor to generate the assisted torque with a direction and a magnitude according to said steering torque, that is the control circuit 38 rotates electric motor 24.

Figure 3:
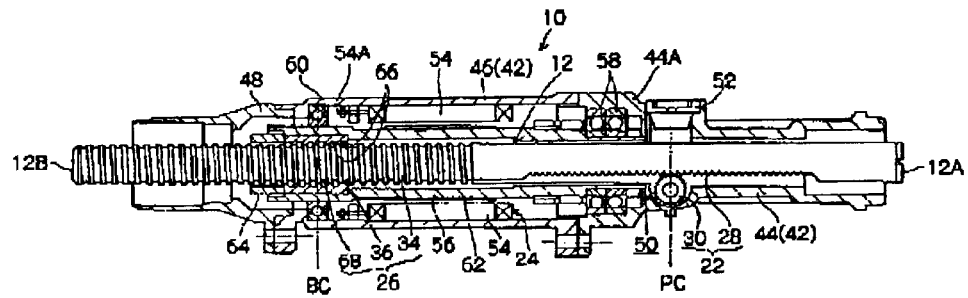
FIG. 3 is a whole view of an electric power steering apparatus according to an embodiment of a present invention.
Figure 4:
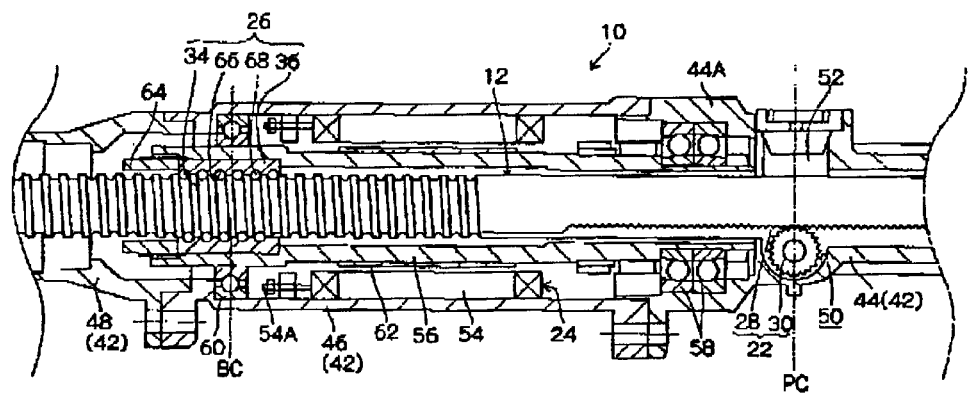
FIG. 4 is a partially enlarged cross sectional view of an electric power steering apparatus according to an embodiment of a present invention.

Hereinafter, a detail construction of the electric power steering apparatus 10 will be described. In FIG. 3 is shown a cross sectional view of a whole construction of the electric power steering apparatus 10. In FIG. 4 is shown a enlarged portion of the lack and pinion mechanism 22, the electric motor 24 and the ball screw mechanism 26. These figures show a stage in a neutral position of the rack shaft 12, that is to say a position maintaining in a stage of straight movement of right and left tires 18.

The electric power steering apparatus provides a housing 42 providing the penetrating rack shaft 12, the rack and pinion mechanism 22, the electric motor 24 and the ball screw mechanism 26. The housing 42 composes a rack housing 44, a tube yoke housing 46 and an end housing 48, each of housings 44, 46, 48 is formed in a cylindrical tube and is concentrically combined each other, for example by a bolt into a unit as a whole. The housing 22 is secured to the vehicle body by an un-illustrated bracket and so on.

The rack housing 44 composes one side of the housing 42 corresponding to the rack shaft 12 and has a pinion room 50 at a location corresponding to a longitudinal center of the rack 28. In the pinion room 50 is installed the pinion 30 in the engaging stage with the rack 28. Upper and lower ends of a shaft for the pinion 30 are rotatably supported by un-illustrated bearings and the upper end is connected to the output shaft 32B. A rack guide 52 is mounted in the opposite inside of the rack housing 44 to the pinion room 50 so that the rack shaft 12 is sandwiched by the rack guide 52 and the pinion 30. The rack guide 52 has an un-illustrated spring to urge the rack guide 52 to be abutted on a back portion of the rack 28 in order to maintain the engagement of the rack 28 and the pinion 30. A longitudinal location of the pinion 30 will be described in detail later.

The tube yoke housing 46 composes a center portion of the housing 42 and is connected to an end surface of an enlarged portion 44A of the rack housing 44. The tube yoke housing 46 is a substantially cylindrical form having almost same diameter to that of the enlarged portion 44A. An armature core 54 is secured to an inside surface of the tube yoke housing 46 in its axial center. A radial center of the armature core 54 is almost same to a radial center of the ball screw 12 to consist of a concentric motor of the rack and pinion power steering apparatus. The armature core 54 has a plurality of peripherally divided slots (not shown) having wound coils (not shown); to each of which a driving current is supplied.

Inside the armature core 54 is oriented a motor shaft 56 being almost tubular cylindrical. The motor shaft 56 is rotatably supported by bearings 58, 60 on both ends in a state that the rack shaft 12 is penetrated. The bearing 58 is mounted in the enlarged portion 44. On the other hand, the bearing 60 that is a bearing of the invention is mounted in the tube yoke housing 46 on the side of the end housing 48. A location of the bearing of the invention will be described in detail later. Ling magnets are bonded to a peripheral surface of the motor shaft 56 corresponding to the armature core 54. Thereby, the motor shaft 56 forms a magnetic path to rotate the motor shaft 56 by supplying the current to coils of the armature core 54 through a contact 54A. The motor 24 consists of the armature core 54 (coils, the contact 54A), the motor shaft 56 and the ling magnets 62. The motor 24 is reversibly rotated in accordance with a control signal of the control circuit 38.

Figure 5:
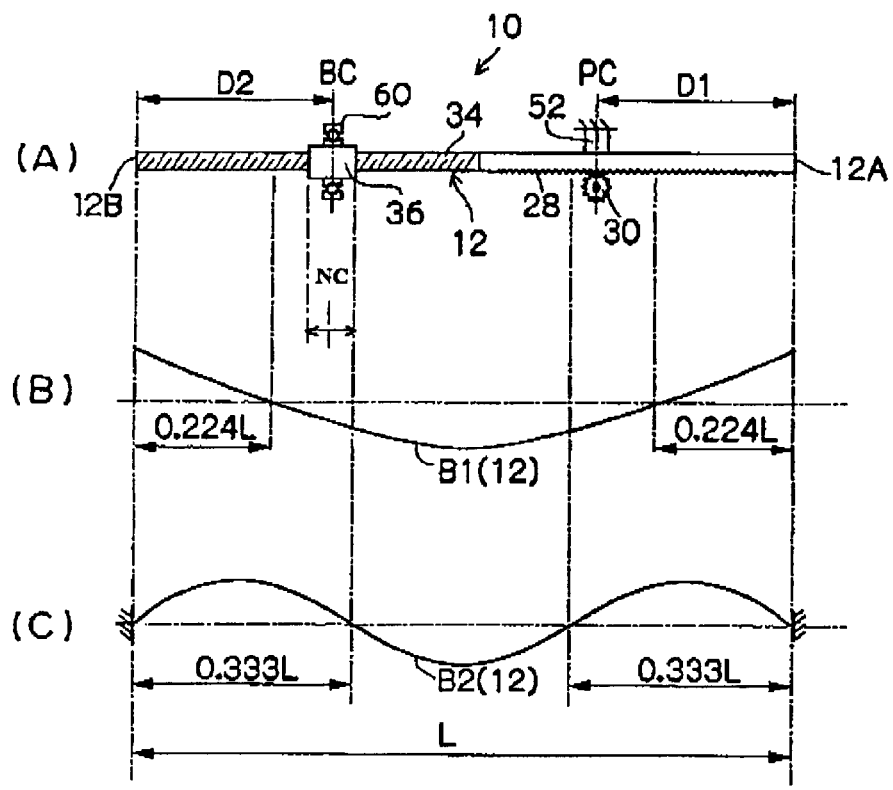
FIG. 5(A) is a schematic diagram of an electric power steering apparatus according to an embodiment of a present invention.
FIG. 5(B) is a chart of a vibration of a rack shaft in a perfect free stage.
FIG. 5(C) is a chart of a vibration of a rack shaft in a restricted stage restricted at the end faces.

Inside the bearing 60, the ball screw nut 36 is fitted on the motor shaft 56 in a locked position by a lock nut 64 and the ball screw nut 36 is rotated with the motor shaft 56. As shown in FIG. 5, an axial center BC of the bearing 60 is coincide with an axial center NC of the ball screw nut 36. Thereby, the ball screw nut 36 is supported by bearing 60 through the motor shaft 56 and is rotatable against the vehicle body, that is the housing 42.

As shown in FIG. 4, a ball groove 66 is formed on an inner surface of the ball is screw nut 36 corresponding to the screw groove 34 of the rack shaft 12. Plural balls 68 are aligned in a spiral ball rolling space between the screw groove 34 and the screw groove 66. The plural balls are endlessly circulated in a predetermined path of the ball screw nut 36 with a load by a relative rotation of the screw groove 34 and the screw groove 66. The end housing 48 is secured to the opposite side of the tube yoke housing 46 to the rack housing 44 to cover an end portion of the motor shaft 56, including the ball screw nut 36 and the lock nut 64, projecting into therein.

The locations of the pinion 30 or the rack guide 52 and of the bearing 60 will be described hereinafter referring to FIGS. 3 and 5. A character L shows an axial length of the rack shaft 12, a character 12A is called as an end face on a side of the rack 28 in the rack shaft 12 and a character 12B is called as an end face on a side of the screw groove 34 of the rack shaft 12. The end face 12A is in a right side and the end face 12B is in a left side in FIG. 3. FIG. 5(A) shows a location relationship of the pinion 30 and the bearing 36 against the rack shaft 12.

A rotating center PC of the pinion 30, called as a pinion center PC hereinafter, is positioned in a state that a distance D1 from the end face 12A of the rack shaft 12 in the neutral position is equal to a length of 0.224L or 0.333L, or is within a length from 0.224L to 0.333L. The rack guide 52 is located in a longitudinal position of the rack shaft 12 corresponding to the pinion 30. An axial center BC of the bearing 60, called as the bearing center BC hereinafter, is located in a state that a distance D2 from the end face 12B of the rack shaft 12 is equal to a length of 0.224L or 0.333L, or is within a length from 0.224L to 0.333L.

FIG. 5(B) shows a beam of the rack shaft 12 in a perfect free stage that is assumed without any restriction, that is to say without any support by the vehicle body. In this stage, a location having the distance 0.224L of the rack shaft 12 from the end face 12A or the end face 12B is positioned in a place corresponding to minimum amplitude of zero of a primary free vibration in the beam having an assumed substantially same cross section of the rack shaft 12.

FIG. 5(C) shows a beam of the rack shaft 12 in a restricted stage restricted at the end face 12A and the end face 12B. In this stage, a location having the distance 0.333L of the rack shaft 12 from the end face 12A or the end face 12B is positioned in a place corresponding to minimum amplitude of zero of a primary free vibration in a beam having the assumed substantially same cross section of the rack shaft 12. These restrictions may be achieved by the tie rod 14 and the knuckle arm 16.

Each of the pinion 30 or the rack guide 52 and the bearing 60 is actually located on the minimum amplitude of the primary free vibration. The locations are suitably decided by a detail theoretical analysis or digital analysis between 0.224L and 0.333L from the end face 12A or the end face 12B of the rack shaft 12. The distance D1 is equal to the distance D2 or not equal to that.

An operation of the preferred embodiment of the invention is now described hereinafter.

In the above-described electric power steering apparatus 10, the driver steers the steering wheel 20 and this steering torque is transformed into the steering force to move axially the rack shaft 12, thereby moving the rack shaft 12 in the direction of the transversal width of the vehicle body. At this time, the torque sensor 40 detects the steering torque and the control circuit 38 generates the assisted torque to the electric motor 24 according to the steering torque. The assisted torque is transformed to the assisted steering force to assist the axial movement of the rack shaft 12 by the ball screw mechanism 26. Thereby, the driving force of the steering wheel by the driver is reduced.

In the electric power steering apparatus 10, there are a reverse force against the tires from a road and a vibration of an engine and also the steering of tires to cause the free vibration of the rack shaft 12 based on its natural frequency. In this case, because the pinion center PC is located at its distance D1 from the end face 12A of the rack shaft 12 within 0.224L to 0.333L, that is to say that the pinion 30 engages with the rack 28 at minimum amplitude of the primary free vibration of the rack 28 in the neutral position, the pinion 30 is not almost affected by the free vibration. Therefore, the amplitude of the rack shaft 12 near the pinion 30 is minimized and this eliminates a deviation in the engagement of the rack shaft 28 with the pinion 30 and eliminates a knocking noise. And also it can restrain a transfer of the vibration to the steering wheel 20 through the pinion 30 to improve the steering feeling.

In the electric power steering apparatus 10, because the bearing center BC is located at its distance D2 from the end face 12B of the rack shaft 12 within 0.224L to 0.333L, that is to say that the ball screw nut 36 engages with the screw groove 34 through the balls 68 at minimum amplitude of the primary free vibration of the rack shaft 28 in the neutral position, the ball screw nut 36 is not almost affected by the free vibration. Therefore, the amplitude of the rack shaft 12 near the bearing 60 is minimized and this restrains a load deviation acting to the ball screw nut 36 supported by the bearing 60. And more particularly because the bearing center BC is coincided with the axial center NC of the ball screw nut 36, that is to say that the ball screw nut 36 receiving a load from the rack shaft 12 through plural balls 68 is supported by the bearing 60 located in the position that the ball screw nut 36 is not almost affected by the free vibration at its center NC, said load deviation is further restrained.

Where the beam of the length L is in a restricted stage at both ends, minimum amplitude of tertiary vibration appears at a location of 0.359L from each of end faces. Therefore, the distances D1, D2 of the pinion center PC and the bearing center BC supporting the rack shaft 12 from end faces 12A, 12B can be set equal to 0.224L or 0.359L or within from 0.224L to 0.359L.

The embodiment of the invention can restrain the transfer of the vibration of the rack shaft 12 to the vehicle body.

While the invention has been described in detail with reference to the preferred embodiment, it will be apparent to those skilled in the art that the invention is not limited to the present embodiment, and that the invention may be realized in various other embodiments within the scope of the claims.

For example, in the aforementioned embodiment the ball screw nut 36 can be formed with the motor shaft 56 bodily or be connected to the motor 24 through a reduction mechanism or a rotational direction transformer. It is possible for the bearing 60 to support directly the ball screw nut 36. And also, the bearing center BC can be offset from the center NC of the ball screw nut 36 within the scope of the invention It can be further constructed that the operation of the steering wheel 20 of the electric power steering apparatus 10 is achieved by an automatic steering system.

Furthermore, the technological components described in this specification and illustrated in the drawings can demonstrate their technological usefulness independently through various other combinations which are not limited to the combinations described in the claims made at the time of application. Moreover, the art described in this specification and illustrated in the drawings can simultaneously achieve a plurality of objectives, and is technologically useful by virtue of realizing any one of these objectives.

What is claimed is:

1. An electric power steering apparatus, comprising:
    a rack shaft having a rack on one side and a screw groove on the other side;
    a pinion rotatably mounted on a vehicle body and engaging with the rack to move axially the rack shaft by being rotated by a steering torque;
    a nut engaged with the screw groove and connected to an electric motor to be rotated by a torque of the electric motor in order to assist the movement of the rack shaft;
    a bearing rotatably supporting the nut on the vehicle body, wherein;

a location of a rotating center of the pinion is positioned in a state that a distance from an end face of the rack shaft in a neutral position is equal to a length of 0.224L or 0.359L or is within a length from 0.224L to 0.359L wherein the L is a length of the rack shaft.

2. An electric power steering apparatus, comprising:

a rack shaft having a rack on one side and a screw groove on the other side;

a pinion rotatably mounted on a vehicle body and engaging with the rack to move axially the rack shaft by being rotated by a steering torque;

a nut engaged with the screw groove and connected to an electric motor to be rotated by a torque of the electric motor in order to assist the movement of the rack shaft;

a bearing rotatably supporting the nut on the vehicle body, wherein;

a location of an axial center of the bearing is positioned in a state that a distance from an end face of the rack shaft in a neutral position is equal to a length of 0.224L or 0.359L or is within a length from 0.224L to 0.359L wherein the L is a length of the rack shaft.

3. An electric power steering apparatus, comprising:

a rack shaft having a rack on one side and a screw groove on the other side;

a pinion rotatably mounted on a vehicle body and engaging with the rack to move axially the rack shaft by being rotated by a steering torque;

a nut engaged with the screw groove and connected to an electric motor to be rotated by a torque of the electric motor in order to assist the movement of the rack shaft;

a bearing rotatably supporting the nut on the vehicle body, wherein;

each longitudinal location of a rotating center of the pinion or an axial center of the bearing is positioned in a state that a distance from an end face of the rack shaft in a neutral position is equal to a length of 0.224L or 0.359L or is within a length from 0.224L to 0.359L wherein the L is a length of the rack shaft.

4. An electric power steering apparatus according to claim 3; wherein the axial center of the bearing coincides with an axial center of the nut.

5. An electric power steering apparatus according to claim 4; wherein the nut has a plurality of balls.

6. An electric power steering apparatus according to claim 5; wherein a radial center of the armature core of the electric motor is almost same to a radial center of the screw groove.

* * * * *